UNITED STATES PATENT OFFICE.

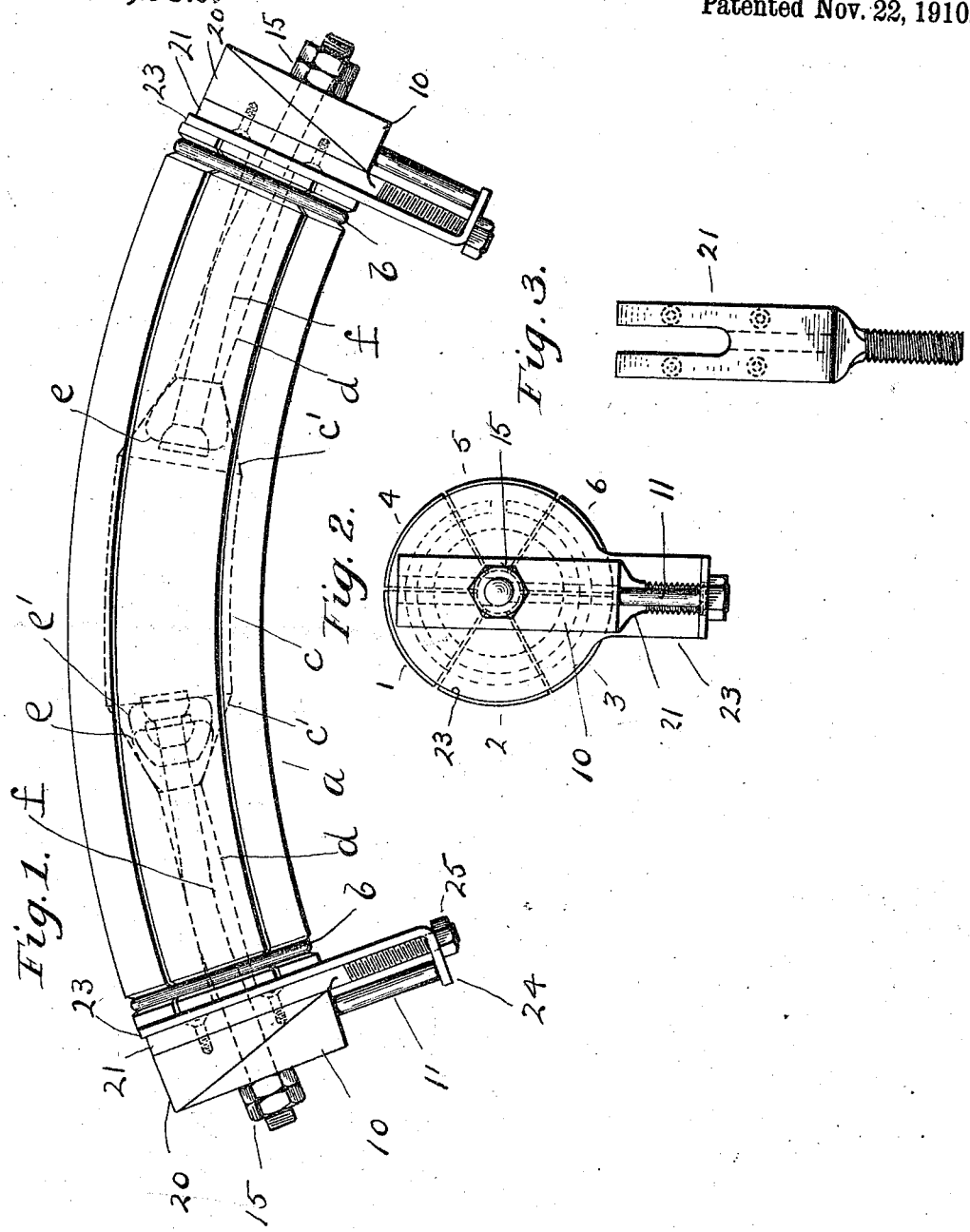

ERNEST A. HOLCOMB, OF HARTFORD, CONNECTICUT.

TIRE-REPAIRING DEVICE.

976,262. Specification of Letters Patent. Patented Nov. 22, 1910.

Application filed December 7, 1908. Serial No. 466,270.

*To all whom it may concern:*

Be it known that I, ERNEST A. HOLCOMB, a citizen of the United States, and a resident of Hartford, in the county of Hartford and State of Connecticut, have invented certain new and useful Improvements in Tire-Repairing Devices, of which the following is a specification.

The device is adapted for use in repairing the outer casings or shoes of double tube tires, such as the tires used on automobiles, and more especially for use during the vulcanizing process in patching the tread of such a shoe.

The object of the invention is to provide a device of the character described having features of novelty and advantage.

In the drawings—Figure 1 is a side elevation of the device. Fig. 2 is an end view thereof. Fig. 3 is a detail of part of the spreader.

In patching the tread of a tire shoe the old rubber is stripped off of the part to be patched as much as possible, the raw rubber is then applied and the tire placed in a mold which covers the part to be patched. A pressure of some sort is introduced into the interior of the shoe, forcing it and holding it securely in the mold during the vulcanizing process. Heretofore the usual method of exerting this pressure on this shoe was by what is known as an air-bag, which was an inflatable bag placed inside of that part of the shoe which was in the mold, the bag being inflated so as to press the shoe against the mold.

My invention provides a mechanical contrivance for exerting this pressure on the interior of the shoe to force it against and hold it in place in the mold. It comprises a collapsible core which when collapsed can be inserted into the interior of the shoe, and means for expanding the core so as to exert an even pressure on all parts of the shoe against the interior of the mold wall.

$a$ denotes the core made up, as shown, of six sections, indicated by numerals from 1 to 6. These sections are held together by an expansible ring $b$ located at each end of the core. The completed core is pierced longitudinally, the opening through it having a central enlargement $c$ connected with the smaller passages $d$ at each end of the core by the conical seats $c'$. A spreading member $e$ of conical form is located in each of the conical seats $c'$ and mounted on rods $f$ which extend through the passages $d$. At the outer ends of the rods $f$ are located coöperating wedges 10—20, held in place on the rods by the nuts 15. The wedges 20 are forked and are secured to a forked bar 21, seen in Fig. 3, so that they can move transversely of the rod $f$. The wedges 10 are held against movement transversely with respect to the rod. The forked bar 21 has its end bent at right angles, as shown at 22. Strut members 23 are mounted on the rod $f$ between the ends of the core and the bar 21, the ends of these strut members being bent, as indicated at 24, and resting on a pin 11 carried by the wedge 10. The end of the bar 21 is threaded and passes through holes in the bent end 24 of the strut members 23 and are engaged by nuts 25.

The manner of use of the device is as follows. The core can be collapsed by slipping the wedges and unloosening the nuts 15 so that the spreading members $e$ can be moved inwardly to the position indicated at $e'$ in Fig. 1. The device is now inserted in the shoe and the nuts 15 are turned, drawing the spreading members $e$ into the conical seats $c'$, spreading the device as much as possible in this way. The nuts 25 are now turned, moving the wedges 20 with respect to the wedges 10, exerting further force on the nuts 15 to still further expand the core until sufficient pressure has been brought to bear on the interior of the shoe. Everything is now ready for the vulcanizing process and when this is completed, by reversal of the operations last above described the core can be readily extracted from the tire.

There is provided in this device a mechanical device for exerting an even pressure on all parts of the tire, thus getting an even distribution of the rubber around the tire during the vulcanizing process. The device is cheaply and strongly made and gives uniformly even results.

I am aware that my invention is susceptible of various modifications and I do not wish to be understood as limiting myself to the precise structure illustrated and described herein.

I claim:—

1. A device for use in repairing the outer casing or shoe of a vehicle tire comprising a collapsible core made up of a plurality of independent longitudinal sections arranged together to approximate the shape of the interior of a shoe, expansible binders for holding the parts of said core in normal position, and means independent of said binders for expanding said core.

2. A device for use in repairing the outer casing or shoe of a vehicle tire comprising a collapsible core made up of a plurality of independent longitudinal sections arranged together to approximate the shape of and adapted to fit the interior of a shoe, expansible binding rings encircling the ends of said core sections, means located within and movable lengthwise thereof for expanding said core, and actuators for said expanding means operable from outside said shoe.

3. A device for use in repairing the outer casing or shoe of a vehicle tire comprising a collapsible core made up of a plurality of independent longitudinal sections arranged together to approximate the shape of the interior of a tire shoe, expansible binding rings for holding the parts of said core in normal position, longitudinally movable expanding members located within said core, a pair of coöperating wedges one of which is secured to said expander and the other mounted for movement transversely thereof.

4. A device for use in repairing the outer casing or shoe of a vehicle tire comprising a collapsible core made up of a plurality of independent longitudinal sections arranged together to approximate the shape of the interior of a tire shoe, a pair of sockets in said core having oppositely disposed inclined sides and formed in part in each section, expanding members located in said sockets, and means for moving said expanding members in opposite directions lengthwise of said core.

5. In a device of the character described a core made up of a plurality of longitudinal sections, a passage extending lengthwise through said core centrally thereof, said passage having an enlarged central portion connecting with the smaller end portions by oppositely disposed conical seats, conical spreading members adapted to coöperate with said conical seats, bars carrying said spreading members and extending in opposite directions through and beyond the ends of said core, nuts engaging the ends of said bars, and coöperating wedges located on said bars, one of said wedges being adapted for movement transversely of the bars, and means for moving said wedge.

6. A device of the character described comprising a core formed of a plurality of longitudinal sections, a passage extending lengthwise through said core centrally thereof and having an enlarged central portion connected with the end passages by oppositely disposed conical seats, conical spreading members located in said seats and adapted for movement longitudinally of said core, bars connected with said spreading members and extending in opposite directions through and beyond the ends of said core, strut members mounted on said bars at the ends of said core, a wedge on each bar held against movement transversely of said bars, and a second wedge located between the first-mentioned wedges and said struts and movable transversely of said bar, and means connected with said transversely moving wedges and having a bearing on said struts for moving said wedges transversely of said bar, substantially as described and for the purposes set forth.

ERNEST A. HOLCOMB.

Witnesses:
D. I. KREIMENDAHL,
H. E. HART.